United States Patent [19]

Insolio

[11] 4,018,372
[45] Apr. 19, 1977

[54] GLASS CUTTING METHOD AND APPARATUS

[75] Inventor: Thomas A. Insolio, Bristol, Conn.

[73] Assignee: The Fletcher-Terry Company, Farmington, Conn.

[22] Filed: Dec. 5, 1975

[21] Appl. No.: 638,041

[52] U.S. Cl. .................................. 225/2; 83/7; 83/12; 225/96.5
[51] Int. Cl.² .................................. C03B 33/02
[58] Field of Search ....... 225/2, 96.5, 97, 103–105; 83/7, 11, 12

[56] References Cited

UNITED STATES PATENTS

| | | |
|---|---|---|
| 1,678,410 | 7/1928 | Warrington ............... 83/12 X |
| 2,507,841 | 5/1950 | Upton ........................... 225/2 |
| 3,371,833 | 3/1968 | Sutton .......................... 225/2 |
| 3,454,219 | 7/1969 | Curtze et al. ............. 225/2 X |
| 3,587,953 | 6/1971 | Stehle ......................... 225/2 |
| 3,718,268 | 2/1973 | Insolio ........................ 225/2 |

Primary Examiner—Frank T. Yost
Attorney, Agent, or Firm—McCormick, Paulding & Huber

[57] ABSTRACT

The internal compressive stresses sub-adjacent the surfaces of relatively thick (over ½ inch) glass sheet material are mechanically reduced on the surface to be scored by bending the glass during the scoring process to allow a glass cutting wheel of conventional geometry to overcome these stresses, and thereby produce a fissure in response to conventional levels of applied force. Spaced pressure applying rollers are provided alongside the cutter wheel, and an anvil wheel located below the cutter wheel reacts the bending moment forces so applied. In one version, these pressure rollers are also used to break out the glass in a second pass, with the cutter wheel retracted. In a second version an additional pair of break out rollers is provided downstream of the cutter wheel, and a pair of stress neutralizing pressure rollers act on the underside of the sheet to prevent running of the break back toward the cutter wheel.

8 Claims, 15 Drawing Figures

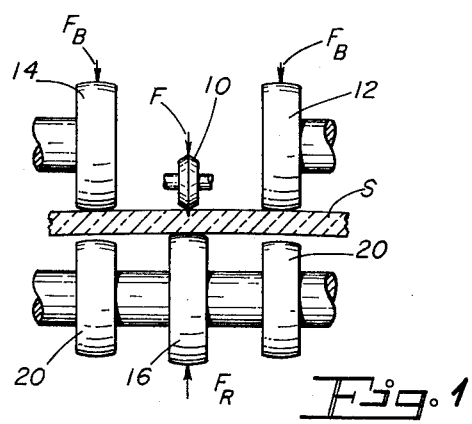
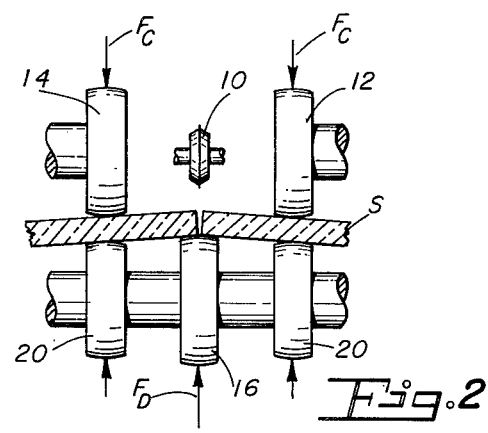
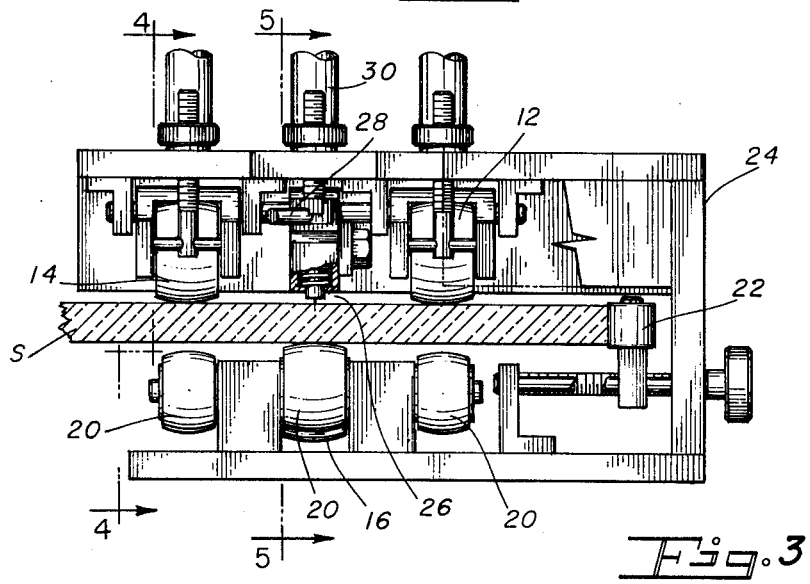
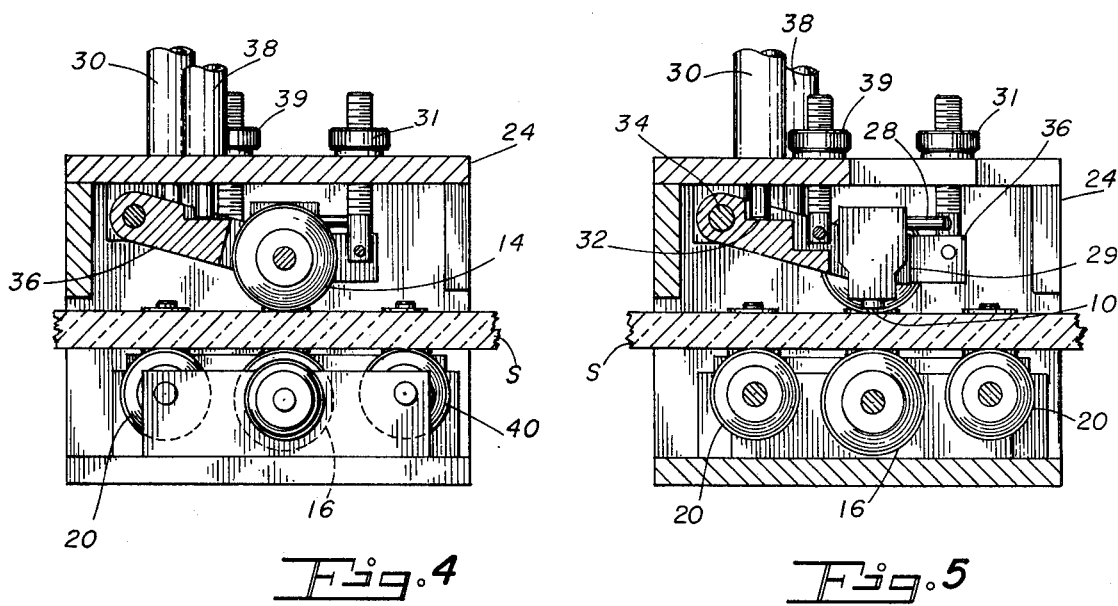

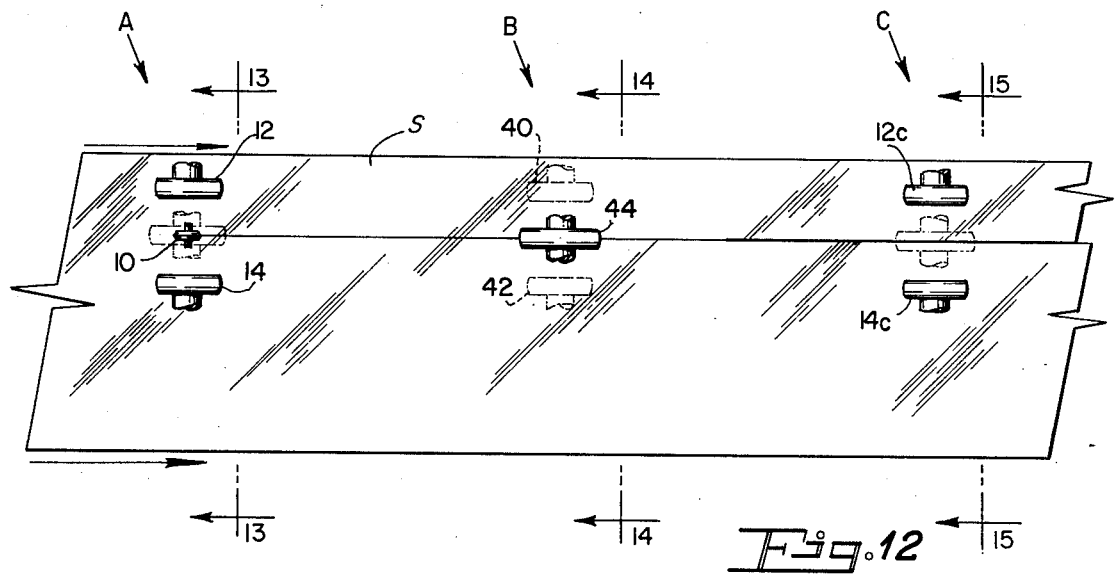
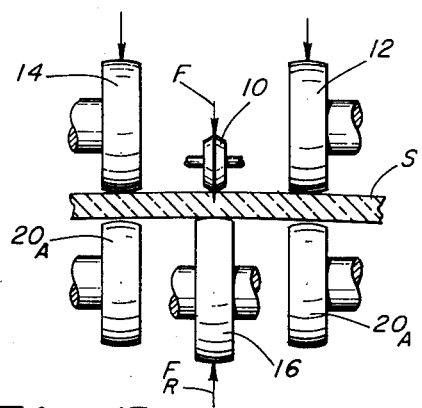
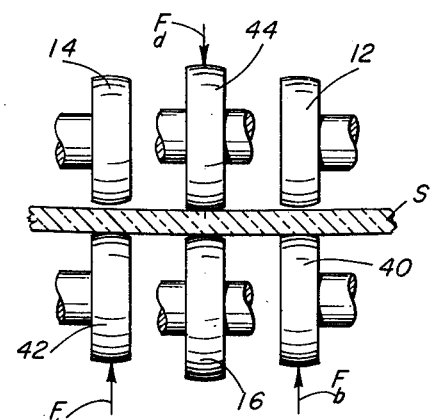
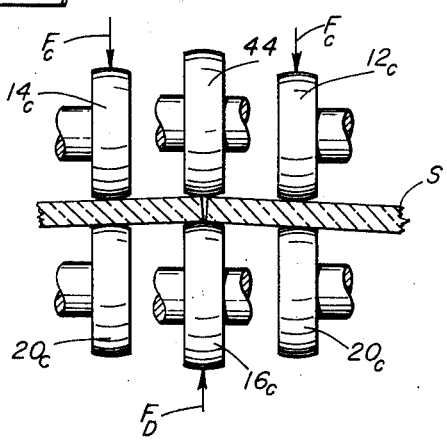

GLASS CUTTING METHOD AND APPARATUS

BACKGROUND OF THE INVENTION

In "cutting" a glass sheet by the conventional two-step score and break method, the geometry of the cutter wheel or scoring tool is such that a concentrated downward force is exerted along the path taken by the wheel as it is drawn across the sheet. This downward force depresses the glass surface slightly, inducing transverse tension forces in the glass at the surface. These tension forces alter tthe residual compressive stresses sub-adjacent the glass surface, and a fissure is produced along the line of the scoring tool. The sheet can then be conveniently broken out in the second step of this process by bending the sheet about an anvil or table edge so as to open up the fissure and separate the glass sheet material.

In carrying out the above-described conventional process, advantage is taken of the inherent stress distribution across the thickness of most glass sheet material. More particularly, and as a result of the fact that molten glass sheet material cools first at its outer surface, and in so cooling contracts, compressive stresses are created in the glass in the area beneath these exterior surfaces. Although these compressive stresses are reacted by internal tension stresses, and although most glass can be annealed to alleviate some such stresses, it has been found that when the glass thickness exceeds ½ inch the compressive stresses are still high enough to prevent creation of the necessary tension at the surface being scored, at least as a result of applying a scoring wheel of conventional geometry. Increasing the force applied to the cutter wheel will only tend to crush the glass. Additional time spent in the annealing process increases the cost of the glass material, and should not be necessary if the only reason for such additional annealing is to improve the glass cutting operation.

The general object of the present invention is to provide a economically feasible method and means for mechanically prestressing the glass to reduce the residual surface compression in the glass at the surface being scored, and thereby facilitate scoring of the glass by a conventional cutter wheel applied to the glass with conventional forces.

SUMMARY OF THE INVENTION

A method for cutting relatively thick glass sheet material by a two-step score and break process characterized by modifying the scoring step to prestress the glass in order to reduce its residual compressive stresses in the area being scored. This prestressing is accomplished by applying forces tending to bend the glass as it is scored. The bending is achieved in one version by passing the sheet between prestress rollers so arranged so as to bend the glass about an anvil wheel or reaction roller located below the scoring tool. These prestress rollers are also adapted to exert the necessary force to break out the sheet material during a second pass over the sheet in one version of the invention. An additional set of break out stress-inducing rollers is provided in another version capable of scoing and breaking in a single pass. This latter version has stress neutralizing rollers provided between the scoring wheel and the break out stress inducing rollers to avoid running of the break back toward the scoring wheel. Obviously, the break must be kept from the scoring wheel itself in order to avoid the break from proceeding upstream of the scoring wheel and thence in an unpredictable direction.

BRIEF DESCRIPTION OF THE DRAWINGS

FIG. 1 is a schematic elevational view showing a glass sheet in the process of being assisted in the scoring process by a pair of glass bending rollers in accordance with the apparatus and method of the present invention.

FIG. 2 is a schematic elevational view of the apparatus shown in FIG. 1 but with the cutter wheel retracted, and the glass bending or stressing roller exerting a greater downward force upon the glass in order to achieve break out.

FIG. 3 is an elevational view of the apparatus depicted schematically in FIGS. 1 and 2.

FIG. 4 is a sectional view taken generally on the line 4—4 of FIG. 3.

FIG. 5 is a sectional view taken generally on the line 5—5 of FIG. 3.

FIG. 12 is a schematic plan view of a two-step, single pass, three station apparatus for cutting relatively thick glass sheet material.

FIG. 13 is a schematic elevational view taken generally on the line 13—13 of FIG. 12.

FIG. 14 is a sectional view taken generally on the line 14—14 of FIG. 12, and

FIG. 15 is a sectional view taken generally on the line 15—15 of FIG. 12.

DETAILED DESCRIPTION OF PREFERRED EMBODIMENT (FIGS. 1 THROUGH 11, INCLUSIVELY)

Figure 6:
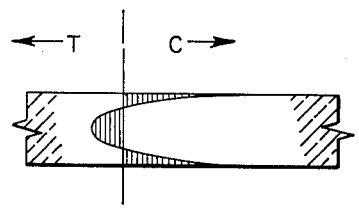
FIG. 6 is a graphical representation of a glass sheet material showing the steady state stress distribution across the thickness of the sheet material.
Figure 7:
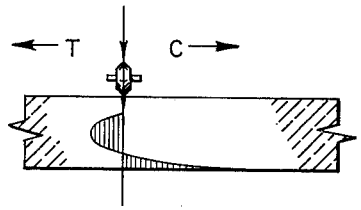
FIG. 7 is a view of the same sheet as depicted in FIG. 6 but with the changes induced as a result of applying a cutter wheel to the upper surface of the glass sheet in order to create a fissure in the sheet in the first step of the conventional two-step score and break method of cutting glass.

Turning now to the drawings in greater detail, the views numbered FIGS. 6 and 7 show schematically the stress distribution across a glass sheet both before and during the scoring step. The cutting of sheet glass is normally accomplished in a two-step process characterized by a scoring step, and followed generally by a breaking step, with the break out being accomplished as a result of extending the fissure created during the scoring step so as to fracture the glass sheet at the score line.

This process depends upon the creation of the fissure to a desired depth, and the ability of glass generally to produce such a fissure is a direct result of the forces produced in the glass during its manufacture. As a result of the cooling of a molten glass sheet material, it is virtually unavoidable that the surfaces of the glass cool before the center portion thereof, giving rise to contraction and compression of the glass adjacent the surfaces, which compressive forces are necessarily reacted by tension forces created in the central portion of the material, (FIG. 6). While annealing tends to alleviate the magnitude of the stresses, most glass material retains the general stress distribution depicted in FIG. 6 and the annealing step serves chiefly to avoid excessive stress concentrations in particular areas of the glass. Thus, the annealing process serves primarily to provide an homogeneous products, wherein the stress distribution across the sheet takes the general form of that depicted schematically in FIG. 6.

As the glass sheet is scored in the manner depicted schematically in FIG. 7, the surface of the glass is depressed slightly by the edge of the cutter wheel applied to the sheet by the force F, creating transverse tension forces in the surface such that the glass fractures slightly on the surface causing a fissure to be created as the scoring wheel is drawn across the sheet. As a result of the geometry of the scoring wheel when taken in combination with the applied force, it will be apparent that the stress distribution of the glass sheet is altered during the scoring process so as to assume the general configuration illustrated in FIG. 7. It will be apparent that the tension forces created at the surface of the sheet, necessary to achieve this change in stress distribution, require that these tension forces exceed the compressive stresses characteristic of glass sheet generally at the surface being scored.

Figure 8:
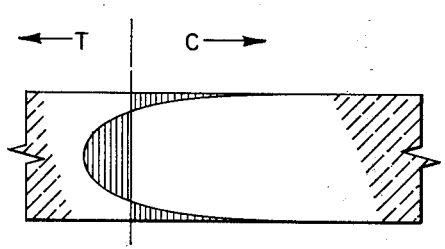
FIG. 8 is a graphical representation of the stress distribution across a relatively thick glass sheet of the type adapted to be cut according to the present invention.
Figure 9:
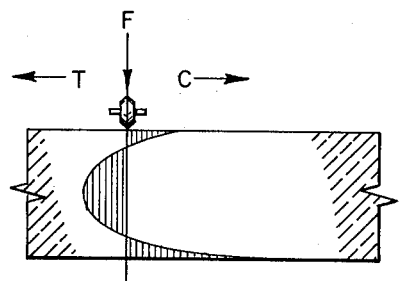
FIG. 9 is a view similar to FIG. 8 but illustrating the changes induced in the stress distribution of the glass sheet in response to application of a conventional cutter wheel to its upper surface.

By way of reference, FIG. 8 shows the stress distribution across a relatively thick (greater than ½ inch) glass sheet, FIG. 8 being substantially similar to FIG. 6 except for the scale effect. More particularly, the compressive stresses at the surface of a relatively thick glass sheet will be somewhat higher than the compressive stresses at the surface of a glass sheet which is thinner (that is, less than ½ inch). While extended annealing time may tend to alleviate this physical characteristic of relatively thick glass sheet, it will be apparent that the expense involved in extending annealing times does tend to become an economic deterrent. As a result of the excessive compressive stresses in the surfaces of relatively thick glass sheet material, application of a cutter wheel of conventional geometry, has the effect of not overcoming, with the tension forces induced by the wheel, the underlying compressive stresses in the glass sheet material. Increasing the applied force will not overcome this effect because of the limitation to this applied force caused by the resulting crushing of the glass at the surface if the force F exceeds well known limits. Varying the cutter wheel geometry has been found to have little or no effect on this particular situation. No satisfactory explanation for this empirical fact has been offered.

In summary then, for glass sheet material to be effectively scored, that is, a fissure of desired depth created as a result of drawing the cutter wheel across the glass, the tensile forces applied by the cutter wheel to the surface of the glass must exceed the residual compressive stresses at the point of application of the cutter wheel. With relatively thin glass sheet material (less than ½ inch in thickness) the application of a reasonable loading force F applied to a cutting wheel of conventional geometry produces the desired tensile forces at the surface of the glass as depicted in FIG. 7, and leads to a satisfactory fissure developed along the line of score. On the other hand, with relatively thick glass sheet material (greater than ½ inch) the tensile forces developed by a conventional cutter wheel applied with conventional loading forces do not create sufficient tensile forces to overcome the inherent compressive stresses in the glass sheet.

Figure 10:
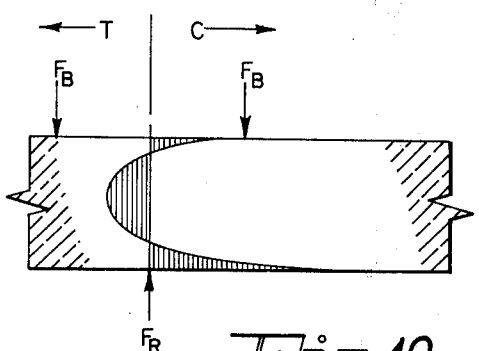
FIG. 10 is a graphical illustration of the resultant stress distribution across a relatively thick glass sheet material as depicted in FIG. 8 achieved as a result of application of prestress wheels of the type illustrated in FIG. 1, but without applying a cutter wheel thereto.
Figure 11:
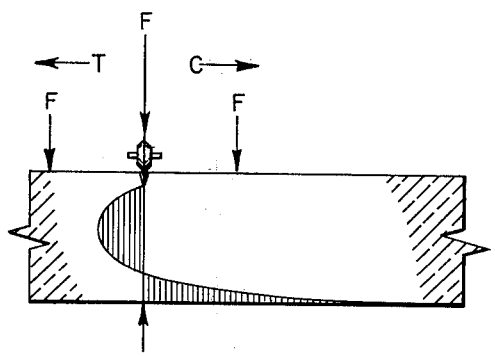
FIG. 11 is a view similar to FIG. 10 but for the changes induced in the stress distribution across the glass sheet material as a result of application of a conventional glass cutter wheel. This view corresponds graphically to FIG. 1 above.

FIG. 10 suggests providing spaced rollers to exert forces $F_B$, $F_B$ on the glass sheet at some distance to either side of the intended line of score. These forces are reacted by an anvil wheel or reaction roller applying an upward force $F_R$ as depicted in FIG. 10. The resulting changes to the stress distribution across the glass sheet are depicted schematically in FIG. 10, and it will be apparent that the compressive stresses adjacent the upper surface of the glass are significantly reduced from those of FIG. 8. As a result of this fact, a conventional cutter wheel applied to the glass surface as shown schematically in FIG. 11, will produce sufficient tensile force so as to overcome the inherent residual compressive stresses in the glass at the surface to be scored with the result that a fissure is created in the glass sheet, facilitating the second break out step of the glass cutting operation.

FIG. 1 shows a conventional cutter wheel 10 applied to the upper surface of a relatively thick glass sheet S with a force F within the range normally used for cutting glass. Bending stress applying rollers 12 and 14 are provided to either side of the cutter wheel 10 and create the downward forces $F_B$, $F_B$ upon the glass sheet S in order to produce a stress distribution as depicted schematically in FIG. 10. With both the cutter and the rollers 12 and 14 applied to the glass sheet, a fissure of the desired depth is achieved in spite of the initially high compressive stresses adjacent the surfaces of the glass sheet S. The reaction roller 16 is provided below the cutter wheel 10 and reacts the combined forces from the rollers 12 and 14 as indicated by the force vector $F_R$.

Once the sheet S has been so scored, the cutter wheel 10 can be retracted to the position shown in FIG. 2, and the prestress wheels 12 and 14 can be moved down slightly with respect to the reaction roller 16 such that relatively higher forces $F_C$ are provided on the glass sheet to break out the glass along the line of score in the second step of the process. The reaction roller or anvil wheel 16 will exert a greater force, as indicated generally at $F_D$ in FIG. 2 and the supporting rollers 20, 20 are provided to either side of the reaction roller 16 to support the glass after it is broken out. These rollers 20, 20 also cooperate with the rollers 12 and 14 to absorb the increased stresses exerted during the break out phase.

FIG. 3 shows an apparatus especially suited for accomplishing the two-step, two-pass method of scoring and breaking relatively thick glass sheet as described hereinabove with reference to FIGS. 1 and 2. The glass sheet material is indicated generally at S, and a side guide roller 22 is provided for engaging the edge of the relatively thick glass sheet to locate the glass sheet as it is passed through the structure 24. While this apparatus of FIG. 3 is especially well suited to handle the glass sheet material as the latter moves through the apparatus, it will be apparent that the glass sheet might be held stationary and a carriage structure or cross head provided for traversing the sheet. Both approaches are deemed to be within the scope of the present invention which requires only that relative motion be provided for between the structure 24 and the glass S.

The cutter wheel 10 is conventionally mounted in a pillar post, indicated generally at 26, which pillar post is removably secured in a movable member 29 by means of a bayonet connection, indicated generally at 28. The lever member 29 is pivotally secured in the frame 24 for limited vertical movement about the axis of pin 34 best shown in FIG. 5. The screw and nut 39 limit the "down" position of the lever 29, and wheel 10, but only when no glass sheet S is being handled. Means is provided for exerting a downward force on the lever 29, at least when the sheet S is being scored, and the presently preferred means for accomplishing this downward force comprises a small hydraulic actuator 30. Varying the hydraulic pressure to the actuator varies the magnitude of the force F on the wheel 10.

The prestress rollers 12 and 14 are rotatably supported adjacent the free ends of corresponding levers, as best shown in FIG. 4 at 36 with reference to the lever for the roller 14. A small hydraulic actuator 38 is adapted to exert a downward force of the intensity desired on the roller 14, as for example the force $F_B$ for prestressing the glass sheet S in bendng during the scoring step. Alternatively, an increased force $F_C$ for breaking out the glass sheet material can also be exerted, the actual force level of applied force being so chosen that the above mentioned bending of the sheet is increased to break out the glass. Adjustable means is provided, in the form of knurled nuts 31 and 39 associated with lead screws connected to the levers 29 and 36 respectively, in order to limit the static downward displacement of the hydraulic actuators 30 and 38 respectively. The glass sheet S is adapted to move through the fixed frame 24, as mentioned previously, and a series of rollers are provided in the fixed frame of the machine in order to support the glass sheet S especially along a line beneath the intended line of score. A single reaction roller 16 is provided immediately beneath the cutter wheel 10 and absorbs the required reaction force, $F_R$ and $F_D$, dictated by the downward forces imposed on the sheet S by the prestress rollers, 12 and 14. Additional rollers 20, 20 are provided below the sheet for supporting it, particularly after it is broken out in FIG. 2. However, a longitudinal series of these rollers 20, 20, best shown in FIG. 5, are provided along the intended line of score for a predetermined distance both upstream and downsteam of the cutter wheel 10. Said rollers 20, 20 are provided at such a height that they aid in supporting and reacting the downward force of the prestress rollers 12 and 14, as best shown in FIG. 4.

The break out phase is accomplished by raising the cutter wheel 10 to render this element ineffective while the sheet S is passed below the prestress rollers 12 and 14 for a second pass. During such second pass, the downward force of the stress applying rollers 12 and 14 will be increased to the level $F_C$ depicted schematically in FIG. 2, with the result that the sheet S is broken along the line of score as indicated in FIG. 2.

DETAILED DESCRIPTION OF ALTERNATIVE EMBODIMENT (FIGS. 12 THROUGH 15, INCLUSIVELY)

The first embodiment described hereinabove involves a two-step method of cutting glass sheet by the so-called score and break method, but as will be apparent from the preceding description, two successive passes are required for the glass sheet S to be scored and broken. Also, adjustments must be made to the location of the cutter wheel 10, and to the force applied by the pressure applying rollers 12 and 14, between these two successive passes. In the embodiment illustrated in FIG. 12, on the other hand, no such intermediate adjustments are required to be made because the glass is scored and broken out in a single pass. Assuming again that the glass sheet S travels with respect to the cutter wheel and its associated rollers, FIG. 12 illustrates three longitudinally spaced stations A, B and C whereupon the glass sheet is acted upon in three different ways. At station A, the geometrical arrangement of the rollers and cutter wheel is similar to that of FIG. 1. More particularly, the cutter wheel 10 is urged downwardly by a force F at station A so that the glass sheet S is adapted to be simultaneously scored and prestressed by the wheels 12 and 14 best shown in FIG. 13. The rollers 20A, 20A actually contact the underside of the glass sheet S at station A, and to this extent FIG. 13 differs from FIG. 1. As a result of the FIG. 13 configuration even a relatively thick sheet of glass can be effectively scored, that is, can be caused to have a fissure developed therein, deep enough to permit the glass to be subsequently broken out.

Station B, best shown in FIG. 14, involves the application of a reverse bending moment on the sheet by means of the wheels, 40 and 42. This bending moment may be applied by suitable actuators and levers (not shown) as described above with reference to FIGS. 3, 4 and 5. These reverse bending stress imposing rollers exert a bending stress on the glass sheet opposite to that imposed by the rollers 12 and 14 at station A, and these stresses are reacted by a reaction roller 44 located above the sheet of glass S and adapted to exert a force $F_d$ against the upper surface of the glass as shown in FIG. 14. The rollers 12 and 14 from station A are also illustrated in FIG. 14 together with the anvil wheel, or reaction wheel 16 illustrated in FIG. 13. However, these rollers 12, 14 and 16 serve to limit the displacement of the glass at station A and rollers 40, 42 and 44 are the only rollers located at station B. Turning next to station C, break out stress applying rollers 12c and 14c apply a break out bending moment to the glass sheet S causing the sheet to snap at the score line. However, the break does not run along the score line because of station B.

The basic reason for the prestress wheels 40 and 42 at station B is to remove the effect of the prestress rollers 12 and 14 utilized at station A in order to prevent the break created by rollers 12c, 14c at the downstream station C from extending upstream along the line of score. Backup rollers 20c, 20c are also provided and correspond to the rollers 20, 20 in FIG. 2 of the first mentioned embodiment. A backup or reaction roller 16c is provided at the break out station C to exert the necessary upward force $F_D$ to counteract the break out forces Fc exerted by the rollers 12c, 14c. The roller 44 in FIG. 15 is actually at station B and not at station C.

In conclusion, the embodiment shown in FIGS. 12 through 15 inclusively comprise an automated system for scoring and breaking relatively thick (½ inch and above) glass sheet material with a cutter wheel of conventional geometry applied to the surface of the glass to be scored with forces within the conventional range, that is, with forces not exceeding those at which crushing of the glass is likely to occur.

I claim:

1. A method of cutting relatively thick sheets of glass, comprising
   a. scoring one surface of the glass by passing a scoring tool along a line of action while
   b. simultaneously bending the glass sheet about the line of action of said tool to decrease the internal compressive stresses adjacent the surface being scored
   c. said bending step including the step of moving at least two pressure applying rollers along the said one surface in directions parallel that of the scoring tool but spaced therefrom, and
   d. reacting the forces imposed by said rollers by moving a reaction roller along the other side of the glass generally opposite the scoring tool.

2. The method according to claim 1 further characterized by the additional step of retracting the cutting tool and moving said pressure applying rollers along paths parallel said line of action, while the scoring tool is retracted, and with additional pressures applied to bend the glass for breaking out the glass along said line.

3. The method according to claim 1 further characterized by the additional step of moving at least two stress neutralizing pressure applying rollers along the other side of the glass also parallel the line of action of the tool and spaced downstream of said scoring tool to neutralize the bending forces set up in the sheet by said first mentioned pressure applying rollers, and moving at least two break out rollers along the said one surface also parallel said line of action and exerting pressures higher than said first mentioned rollers to break out the glass along said line to a point short of said stress neutralizing rollers on the other side of the glass.

4. Apparatus for scoring relatively thick glass sheet material, and comprising
   a. structure for receiving the glass to be scored and for permitting relative motion therebetween
   b. a scoring tool and means mounting said tool in said structure at a scoring station for exerting a force generally normal to the surface to be scored,
   c. at least one anvil roller so mounted in said structure as to engage the surface opposite said scored surface and located generally opposite said scoring station
   d. at least two pressure applying rollers mounted alongside said scoring tool in said structure for exerting a bending moment on the glass being scored at said scoring station.

5. Apparatus according to claim 4 further characterized by movable means supporting both pressure applying rollers, and means for varying the force exerted by said rollers on said glass.

6. Apparatus according to claim 5 wherein said means for supporting said scoring tool in said structure is movable for retracting said scoring tool away from the glass at said scoring station.

7. Apparatus according to claim 5 further characterized by a pair of stress neutralizing rollers at a second station downstream of said scoring station, said stress neutralizing rollers engaging the surface opposite said scored surface to neutralize said bending moment at a second station downstream of said scoring station.

8. Apparatus according to claim 7 further characterized by a pair of breaking pressure applying rollers at a third station downstream of said second station to break out the glass at said third station without running the break upstream to said second station.

* * * * *